United States Patent [19]
Biglione et al.

[11] Patent Number: 5,256,722
[45] Date of Patent: Oct. 26, 1993

[54] BLENDS BASED ON VINYL AROMATIC POLYMERS HAVING HIGH MOLDING FLUIDITY AND HIGH THERMO RESISTANCE

[75] Inventors: Gianfranco Biglione; Gian Claudio Fasulo, both of Mantova, Italy

[73] Assignee: Montedipe S.r.l., Italy

[21] Appl. No.: 924,588

[22] Filed: Aug. 6, 1992

Related U.S. Application Data

[63] Continuation of Ser. No. 588,502, Sep. 24, 1990, abandoned, which is a continuation of Ser. No. 364,532, Jun. 12, 1989, abandoned, which is a continuation of Ser. No. 120,665, Nov. 16, 1987, abandoned.

[30] Foreign Application Priority Data

Nov. 21, 1986 [IT] Italy ......................... 22421 A/86

[51] Int. Cl.$^5$ .................. C08L 25/08; C08L 25/12; C08L 25/14; C08L 25/06
[52] U.S. Cl. .................... 524/513; 524/504; 525/64; 525/146; 525/148; 525/166; 525/173; 525/174
[58] Field of Search ............... 525/174, 64, 146, 148, 525/166, 177; 524/513, 504

[56] References Cited

U.S. PATENT DOCUMENTS

| | | | |
|---|---|---|---|
| 3,935,153 | 1/1976 | Kudo | 525/64 |
| 3,954,903 | 5/1976 | Kudo | 525/64 |
| 4,122,057 | 10/1978 | Lamont | 524/513 |

*Primary Examiner*—Patricia A. Short
*Attorney, Agent, or Firm*—Morgan & Finnegan

[57] ABSTRACT

Blends having a high molding fluidity and flowability and high thermoresistance comprising:
(a) at least one vinyl-aromatic thermoplastic polymer; and
(b) at least one copolyester having a melting point lower than the molding temperature of the thermoplastic polymer (a), and preferably lower than 200° C., a melt viscosity, at 232° C., lower than 50 Pa.S., and obtained from at least one bicarboxylic aromatic acid, at least one aliphatic bicarboxylic acid, and at least one glycol.

11 Claims, No Drawings

BLENDS BASED ON VINYL AROMATIC POLYMERS HAVING HIGH MOLDING FLUIDITY AND HIGH THERMO RESISTANCE

This is a continuation of co-pending application Ser. No. 07/588,502, filed on Sep. 24, 1990, now abandoned, which is a continuation of Ser. No. 07/364,532, filed Jun. 12, 1989 now abandoned, which is a continuation of application Ser. No. 07/120,665, filed Nov. 16, 1987, now abandoned.

DESCRIPTION OF THE INVENTION

The present invention relates to blends based on vinyl-aromatic thermoplastic polymers having high molding fluidity and high thermoresistance.

More particularly, the present invention relates to blends based on styrenic thermoplastic polymers and copolyesters obtained from an aromatic dicarboxylic acid, an aliphatic dicarboxylic acid, and at least one glycol, suitable for producing shaped articles provided with good mechanical and thermal properties.

For their particular properties, the above blends have found application in a wide range of uses of the thermoplastic materials, and particularly of the styrenic materials, in order to obtain, according to per se known technologies, molded articles having good appearance and excellent mechanical and thermal characteristics.

As is well known, molded articles are generally obtained by injection-molding consisting in melting the thermoplastic material in a heated plasticization chamber, for example an electrically heated chamber, and then in injecting it into a mold maintained at a temperature lower than that of the deformation point of the material, wherein the settling of this later results in the desired shape.

Shaped articles having intricate shapes, and also very wide surfaces, may be obtained by these working conditions with the proviso that there are available thermoplastic polymers having a good heat fluidity and flowability and requiring quite low molding temperatures.

In fact, the low molding temperatures allow one to perform both with very short working cycles, owing to the low quantity of heat to be disposed of in the subsequent cooling phase of the article in the mold, and to reduce the risk of a possible thermal degradation during the working, especially for some polymers having rather low decomposition or degradation temperatures.

A technique generally used for increasing the heat fluidity or flowability of the thermoplastic polymers is the addition of lubricants or low-melting materials suitable for increasing the flowability of the melt polymer in the filling phase of the molds.

The lubricants, however, if on the one hand, help to fluidify the thermoplastic polymer, on the other, present the drawback of decreasing the heat properties later, such as the thermoresistance; this constitutes a big drawback, and above all, in case of technics where polymers are used for the production of articles that have to withstand high temperatures during use.

It has now been discovered, in accordance with the present invention, that the fluidity and the flowability of the thermoplastic vinyl-aromatic polymers in the melt state may be considerably improved, by maintaining constant in at the same time their properties of thermoresistance by blending said polymers with at least one copolyester having a melting temperature lower than the molding temperature of the thermoplastic vinyl-aromatic polymer, a melt viscosity, at 232° C., lower than 50 Pa.S, a second order transition temperature (Tg) between −30° and 50° C., and obtained from at least one aromatic dicarboxylic acid, at least one aliphatic dicarboxylic acid, and at least one glycol.

The present invention contemplates, therefore, blends having high fluidity at molding and high thermoresistance, comprising:

(a) a thermoplastic vinyl-aromatic polymer, and
(b) at least one copolyester having a melting point lower than the molding temperature of the thermoplastic polymer (a), a melt viscosity, at 232° C., lower than 50 Pa.S., a second order transition temperature (Tg) between −30° and +50° C., and obtained from at least one aromatic dicarboxylic acid, at least one aliphatic dicarboxylic acid, and at least one glycol.

The proportions between the two components (a) and (b) may be varied over a wide range, depending on the type of the individual components, on the operative conditions, and on the required properties of the end product.

More particularly, quantities between 60% and 98%, and preferably between 75% and 95% by weight of the vinyl-aromatic polymer (a), and, correspondingly, quantities between 40% and 2% and, preferably, between 25% and 5% by weight of the copolyester (b), determined with respect to the total weight of the blend, are practically preferred.

The above blends have a high fluidity and flowability in the molten state such as to ensure a complete filling of the mold, without any adverse influence on the mechanical or physical properties of the resulting product.

The above copolyester (b) has the advantage that, at the melt stage it shows a sudden lowering of the viscosity and a correspondingly strong increase in fluidity, and therefore promotes the flowability of the thermoplastic polymer in which it was dispersed during the filling of the mold. After the cooling, on the other hand, owing to its high Tg, it maintains practically unvaried the settling capacity of the melt material into the mold and the heat resistance of the molded article thus obtained.

These copolyesters (b), moreover, have a sufficient compatibility with the vinyl-aromatic polymer to which they are added so that they do not impart negative collateral effects on the aesthetic and mechanical properties of the resulting molded articles.

Copolyesters (b), suitable for being used as lubricants in the blends of the present invention, have preferably a melt viscosity, at 232° C., between 20 and 50 Pa.S., a second order transition temperature between −30° and +50° C., and a melting point between 100° and 200° C.

The above copolyesters are obtained, according to well-known polycondensation or poly-trans-esterification techniques, of an aromatic dicarboxylic acid and an aliphatic dicarboxylic acid, optionally in the form of alkyl-esters, with a glycol.

The aromatic dicarboxylic acid generally has a molecular weight less than 350. Representative examples of suitable aromatic dicarboxylic acids are terephthalic acid, isophthalic acid, phthalic acid, dibenzoic acid, etc.

Terephthalic acid is preferred and, if desired, may be employed in admixture with up to 50% by moles of isophthalic acid.

The aliphatic dicarboxylic acid preferably contains from 6 to 12 carbon atoms. Representative examples are adipic acid, pimelic acid, suberic acid, azelaic acid, sebacic acid, nonandicarboxylic acid, etc.

The amount of aliphatic dicarboxylic acid in the copolyester is preferably between 5 and 35% by moles of the acid component.

The glycols used in the preparation of the copolyester (b) have the formula:

$$HO-R_1-OH \qquad (I)$$

wherein $R_1$ is a linear or branched alkylene radical containing from 2 to 20 carbon atoms or a cycloalkylene radical containing from 6 to 20 carbon atoms.

Examples of glycols having formula (I) are ethylene glycol; propylene glycol; 2,2-dimethyl-1,3-propane diol; 2,2-diethyl-1,3 propane diol; 2,2-diphenyl-1,3-propane diol; 2,2-dimethoxy-1,3-propane-diol; 1,2-, 1,3-, and 1,4-butane-diol; 2,3-butane-diol; 3,3-dimethyl-1,5-pentane-diol; 1,6-hexane-diol; 1,7-heptane-diol; cyclohexanediol; cyclohexanedimethanol, etc., as well as mixtures of these glycols.

The aliphatic glycols containing from 2 to 8 carbon atoms are particularly preferred.

The above copolyesters (b) are generally known as "Hot melts" and are produced and sold by the Dutral Society, S.p.A. under the trademark "PIBITER HM".

In the following Table I some commercial types of "PIBITER HM", with their physical properties, are reported:

TABLE I

| Properties | Method | Units | PIBITER HM A18 F | PIBITER HM A18 H | PIBITER HM A20 G | PIBITER HM C13 L | PIBITER HM C17 L |
|---|---|---|---|---|---|---|---|
| Melting point (I) (16° C./min) | ASTM E 28° | C. | 180 ± 5 | 180 ± 5 | 200 ± 5 | 135 ± 5 | 175 ± 5 |
| Crystallinity | X Rays | % | 30 ± 5 | 30 ± 5 | 35 ± 5 | 20 ± 5 | 30 ± 5 |
| Viscosity at 232° C. | MA 17204 | Pas | 25 ± 5 | 35 ± 5 | 25 ± 5 | 45 ± 5 | 45 ± 5 |
| Viscosity Brookfield | ASTM D.3236 −73 | Poises | 250 ± 50 | 350 ± 50 | 250 ± 50 | 450 ± 50 | 450 ± 50 |
| Flow Index | ASTM D.1238 −73 | g/10' | | | | | |
| at 190° C. | | | 120 −180 | 85 −180 | | 55 −75 | 55 −75 |
| at 230° C. | | | 300 −440 | 230 −330 | 300 −400 | 170 −220 | 170 −220 |

(I) DETERMINED BY THE DIFFERENTIAL SCANNING COLORIMETER

The term "vinyl-aromatic copolymer", whenever used in the present description and in the claims, means any thermoplastic, i.e., containing, chemically bound, at least 40% by weight, of one or more vinyl aromatic compounds having the formula (II):

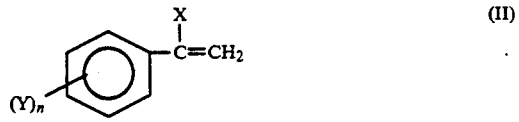

$$(II)$$

in which X is hydrogen or an alkyl radical having from 1 to 4 carbon atoms; n is zero or an integer from 1 to 5, and Y is a halogen or an alkyl radical having from 1 to 4 carbon atoms.

Examples of vinyl-aromatic compounds having the above formula (II) are styrene; methyl-styrene; mono-, di-, tri-, tetra- and penta-chloro-styrene and the corresponding alpha-methyl-styrenes, nuclear-alkylated styrenes and the corresponding alpha-methyl-styrenes such as ortho- and para-methyl-styrenes, ortho- and para-ethyl-styrenes, ortho- and para-methyl-alpha methyl-styrenes, etc.

These monomers are utilizable either alone or in admixture with one another or with other copolymerizable ethylenically unsaturated co-monomers such as for example maleic anhydride, acrylonitrile, methyl-acrylate, methyl-methacrylate, etc., in a quantity up to 60% by weight.

The term "vinyl-aromatic polymer" also includes the high impact vinyl-aromatic polymer containing no more than 50% by weight, and preferably between 5 and 35% by weight of a rubber.

The rubbers utilized for this purpose may be the natural and synthetic rubbers. Suitable synthetic rubbers are polybutadiene, polyisoprene, the butadiene and/or isoprene copolymers with styrene or with other monomers, or the saturated rubbers having a glass transition temperature (Tg) lower than −20° C., such as, for example, the ethylene-propylene, the ethylene-propylene-diene terpolymers, silicone rubbers with unsaturated groups, and the like.

Preferably the vinyl-aromatic polymer may be polystyrene, or a copolymer of the styrene or of styrene-alpha-methyl-styrene containing from 2 to 25% by weight of an ethylenically unsaturated nitrile, particularly acrylonitrile, or of maleic anhydride, optionally given high impact properties by the addition of up to 35% by weight of a rubber.

In the preparation of the blends of the present invention, the styrenic polymers or copolymers may be used alone or in admixture.

The blends of the present invention may also be mixed with other technopolymers as such polycarbonate (PC), polyvinyl chloride (PVC), nylon 6 or 66, polyethylene terephthalate (PET), and the like, both as they are or as modified to make them self-extinguishable, dyeable, etc., and again in the form reinforced by glass fibers.

The blends of this invention may be prepared by many conventional methods, such as by extrusion in a single-screw or two-screw extruders followed by granulation or by mastication in Banbury mixers followed by working in a calender, at temperatures generally ranging from 180° to 260° C.

The blends may also contain per se known additives such as stabilizers, plasticizers, antiflame agents, antistatic agents, dyestuffs, pigments, glass fibers, inorganic fillers, etc., which are intimately incorporated in order to impart particular desired characteristics to the material.

For a better understanding of the present invention, a few illustrative but not limitative examples are given hereinafter.

EXAMPLES

In the examples, unless otherwise specified, all parts and percentages are by weight.

The characteristics of the blends of the present invention were examined on injection test plates, using the following methods:

1. Flow index (M.F.I.) were determined according to the ASTM D 1238-73 standard.
2. Softening temperature (VICAT) was determined according to the DIN 53460 standard.

3. Heat distortion temperature (HDT) was determined according to the ASTM D 648 standard, at 66 psi and 264 psi.

4. IZOD resilience w.n. (with notch) was determined at 23° C., according to the ASTM D 256 standard, by using a test bar ½"×⅛".

5. Resistance to tensile stress was determined according to the ASTM D 790 standard.

EXAMPLES 1 TO 7

A blend of a styrenic copolymer, consisting of 72% by weight of styrene, 8% by weight of acrylonitrile, 12% by weight of alpha-methyl-styrene, and 8% by weight of a polybutadiene rubber having a 1,4- cis content of 35%, and a PIBITER/HM copolyester of the type reported below in Table II and obtained by polycondensation of terephthalic acid, adipic acid, isophthalic acid, ethylene glycol, and butanediol, was fed, with degassing in the proportions reported in Table II, into a BANDERA TR45 single-screw extruder having a length/diameter ratio equal to 30.

The blend was extruded at a temperature of 200° C. and the granules obtained were injection-molded for obtaining test plates for carrying out the mechanical-physical tests.

Examples 1 and 2 are for comparison and relate to the above-identified styrenic copolymer as such and to the same copolymer obtained during polymerization in mineral oil in the quantities reported in Table (II).

TABLE II

| Composition | Units | 1 | 2 | 3 | 4 | 5 | 6 | 7 |
|---|---|---|---|---|---|---|---|---|
| Styrene copolymer | | 100 | 97.5 | 95 | 95 | 85 | 95 | 85 |
| Mineral oil | | — | 2.5 | 5 | — | — | — | — |
| PIBITER HM C17L | | — | — | — | 5 | 15 | — | — |
| PIBITER HM A18F | | — | — | — | — | — | 5 | 15 |
| Properties | Units | | | | | | | |
| MFI (220/10) | g/10' | 11 | 20 | 30 | 19 | 33 | 21 | 40 |
| VICAT 1 Kg. | °C. | 105 | 99 | 93 | 103 | 104 | 103 | 103 |
| 5 KG. | °C. | 96 | 91 | 85 | 95 | 94 | 94 | 94 |
| HDT 66 psi | °C. | 96 | 92 | 88 | 96 | 96 | 95 | 95 |
| 264 psi | °C. | 89 | 85 | 80 | 89 | 88 | 88 | 87 |
| IZOD (with notch) | J/m | 94 | 85 | 80 | 80 | 70 | 95 | 90 |
| TENSILE STRENGTH | | | | | | | | |
| yield strength | N/mm² | 31 | 25 | 20 | 30.5 | 32 | 30 | 31 |
| elongation at break | % | 41 | 39 | 35 | 31 | 51 | 35 | 53 |
| elastic modulus | N/mm² | 1900 | 1800 | 2100 | 1950 | 1950 | 1950 | 1700 |

EXAMPLES 8 TO 10

Operating according to the process conditions of Examples 1 to 7, a blend consisting of:

A. a blend of:
(i) 25% by weight of a styrenic copolymer (AES) containing 24% by weight of acrylonitrile, 30% by weight of an ethylene-propylene-diene rubber, and 46% by weight of styrene;
(ii) 25% by weight of a styrenic copolymer (SAN) containing 24% by weight of acrylonitrile and 76% by weight of styrene; and
(iii) 50% by weight of a copolynmer (CR) containing 24% by weight of acrylonitrile, 8% by weight of a polybutadiene rubber, and 68% by weight of styrene;

B. a PIBITER HM A 18F copolymer, in the quantities reported in Table III, was fed into the extruder.

The blend characteristics determined on the test plates are reported in the following Table III.

| | | Examples | | |
|---|---|---|---|---|
| | | 8 | 9 | 10 |
| AES/SAN/CR BLEND | | 100 | 95 | 85 |
| PIBITER HM A18F | | — | 5 | 15 |
| Properties | Units | | | |
| M.F.I. (220/10) | g/10' | 12 | 22 | 47 |
| VICAT 1 Kg. | °C. | 99 | 97 | 95 |
| 5 Kg. | °C. | 90 | 89 | 86 |
| HDT 66 psi | °C. | 93 | 92 | 87 |
| 264 psi | °C. | 84 | 83 | 81 |
| IZOD (with notch) | J/m | 215 | 250 | 220 |
| TENSILE STRENGTH | | | | |
| yield strength | N/mm² | 30 | 29.5 | 29 |
| elongation at break | % | 35 | 32 | 20 |
| elastic modulus | N/mm² | 2100 | 2050 | 1800 |

What is claimed is:

1. Blends having high fluidity and flowability for molding and high thermoresistance, comprising:
   (a) about 75% to 95% by weight of at least one vinyl-aromatic thermoplastic polymer containing at least 40% by weight of a vinyl aromatic monomer; and
   (b) about 5 to 25% by weight of at least one copolyester having a melting point lower than the molding temperature of the thermoplastic polymer (a), and between 100° and 200° C., a melt viscosity between 20 and 40 Pa.S. at 232° C., a second order transition temperature (Tg) between −30° and +50° C., and obtained from at least one aromatic dicarboxylic acid, at least one aliphatic dicarboxylic acid, and at least one glycol.

2. Blends according to claim 1, wherein the copolyester is obtained from at least one aromatic dicarboxylic acid having a molecular weight less than 350, at least one aliphatic dicarboxylic acid containing from 6 to 12 carbon atoms, and at least one glycol having the formula:

$$HO-R_1-CH \qquad (I)$$

wherein $R_1$ is a linear or branched alkylene radical containing from 2 to 20 carbon atoms or a cycloalkylene radical containing from 6 to 20 carbon atoms.

3. Blends according to claim 1, wherein the vinyl-aromatic thermoplastic polymer (a) contains at least 40% by weight of one or more vinyl aromatic monomers having the formula:

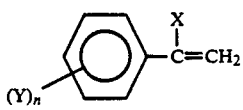

in which X is hydrogen or an alkyl radical having from 1 to 4 carbon atoms, n is zero or an integer between 1 and 5, and Y is a halogen or an alkyl radical having from 1 to 4 carbon atoms.

4. Blends according to claim 3, wherein the vinyl-aromatic thermoplastic polymer (a) is a co-polymer having at least 40% of styrene and up to 60% by weight of another ethylenically unsaturated co-monomer copolymerizable with the styrene.

5. Blends according to claim 4, wherein the ethylenically unsaturated co-monomer copolymerizable with the styrene is selected from the group consisting of maleic anhydride, acrylonitrile, methyl-acrylate, methyl-methacrylate, alpha-methyl-styrene and mixtures thereof.

6. Blends according to claim 1, wherein the vinyl-aromatic thermoplastic polymer is high impact and contains no more than 50% by weight, of rubber.

7. Blends according to claim 1, containing in addition polycarbonate, polyvinylchloride, nylon, and polyethylene terephthalate.

8. Blends according to claim 1, containing in addition stabilizers, plasticizers, antiflame agents, antistatic agents, dyestuffs, pigments, glass fibers, and inorganic fillers.

9. Blends according to claim 1, wherein the vinyl-aromatic thermoplastic polymer is high impact and contains between 5 and 35% by weight of rubber.

10. The blends according to claim 1, wherein the melt viscosity is between 20 and 30 Pa.S. at 232° C.

11. The blends according to claim 1, containing about 85% to 95% by weight of said at least one vinyl-aromatic thermoplastic polymer (a) and about 5 to 15% by weight of said at least one copolyester (b).